United States Patent [19]
Col et al.

[11] Patent Number: 5,887,175
[45] Date of Patent: Mar. 23, 1999

[54] APPARATUS AND METHOD FOR MANAGING INTERRUPT DELAY ON FLOATING POINT ERROR

[75] Inventors: Gerard Col; G. Glenn Henry, both of Austin, Tex.

[73] Assignee: Integrated Device Technology, Inc., Santa Clara, Calif.

[21] Appl. No.: 800,612

[22] Filed: Feb. 14, 1997

[51] Int. Cl.$^6$ .................................................. G06F 9/46
[52] U.S. Cl. ............................................................ 395/733
[58] Field of Search .................................... 395/733, 735, 395/739

[56] References Cited

U.S. PATENT DOCUMENTS

| | | | |
|---|---|---|---|
| 5,129,064 | 7/1992 | Fogg et al. | 395/500 |
| 5,134,693 | 7/1992 | Saini | 395/591 |
| 5,193,158 | 3/1993 | Kinney et al. | 395/591 |
| 5,301,312 | 4/1994 | Christopher et al. | 395/183.08 |
| 5,303,378 | 4/1994 | Cohen | 395/737 |
| 5,410,657 | 4/1995 | Olson et al. | 395/391 |
| 5,421,021 | 5/1995 | Saini | 395/800 |
| 5,502,827 | 3/1996 | Yoshida | 395/800.23 |
| 5,559,977 | 9/1996 | Avnon et al. | 395/591 |

*Primary Examiner*—David Y. Eng
*Attorney, Agent, or Firm*—James W. Huffman

[57] ABSTRACT

A method and apparatus for handling interrupts after transition of a mask flag is provided. In x86 processors, if the IF flag is set, interrupts are to be handled. However, if the IF flag transitions from a clear state to a set state, and the instruction which sets the IF bit is an STI instruction, then a pending interrupt is to be delayed for one instruction, unless the following instruction is a floating point instruction, and then the interrupt is to be handled immediately. The invention allows an interrupt to cause a branch to an exception handler if the IF bit is set. The exception handler determines whether the prior instruction was an STI instruction, and whether the prior state of the IF bit was clear. If both these conditions are true, the exception handler branches back to the main program. If either condition is not true, the exception handler branches to an interrupt service routine. If the instruction following STI is a floating point instruction, a floating point error condition causes program flow to branches to a floating point exception handler which clears the error flag and handles the interrupt if the prior instruction was STI.

26 Claims, 8 Drawing Sheets

| IF State | Interrupt Status |
|---|---|
| 0 | mask interrupt |
| 1 | allow interrupt |

400

| Transition | Interrupt Status |
|---|---|
| 1 → 1 | allow interrupt |
| 1 → 0 | do not allow interrupt |
| 0 → 0 | do not allow interrupt |
| 0 → 1 | allow interrupt, but delay for one instruction if the instruction which set the IF bit was STI, unless next instruction is a floating point instruction, then allow interrupt immediately |

402

APPARATUS AND METHOD FOR MANAGING INTERRUPT DELAY ON FLOATING POINT ERROR

DESCRIPTION OF RELATED ART

This application is related to U.S. patent Ser. No. 08/800, 611 (Docket# IDT:1281), filed Feb. 14, 1994, entitled APPARATUS AND METHOD FOR MANAGING INTERRUPT DELAY ASSOCIATED WITH MASK FLAG TRANSITION" by Gerald Col and G. Glen Henry.

BACKGROUND OF THE INVENTION

1. Field of the Invention

This invention relates in general to the field of interrupt handling in computer systems, and more particularly to handling a floating point error interrupt after transition of an interrupt mask flag.

2. Description of the Related Art

Within a computing system, input/output (I/O) devices often require assistance, or servicing, by a processor. To communicate with the processor, I/O devices use a signal line known as an interrupt request line to request the processor's assistance.

The kind of servicing which an I/O device needs is defined by the type of device and its current condition. For example, a parallel port connected to a printer may generate an interrupt request to ask the processor for the next character to be sent to the printer. In this case, the processor would respond by performing an I/O write bus cycle to send the next character to the parallel port.

Another example would be the interrupt request generated by a hard disk controller to tell the processor that a data transfer to or from memory has been completed. If this were a disk read operation, for example, the processor would respond to the interrupt request by using the data that has been transferred from the disk controller into memory.

A third example would be when a keyboard interface generates an interrupt request to inform the processor that a key has been pressed. The processor should respond by performing an I/O read from the keyboard interface to get the keyboard character.

In each of the above cases, the processor responds to an interrupt request by executing a special program known as an interrupt service routine. The interrupt service routine's task is to service the request. Different types of interrupt requests require different types of servicing on the part of the processor. This means that there must be a separate interrupt service routine for each type of interrupt request that can be generated by the various I/O devices connected to the processor.

When an interrupt occurs, the processor temporarily suspends execution of the current program and forces it to jump to another program, the interrupt service routine. At the conclusion of the interrupt service routine, the processor returns program flow at the point where it was interrupted.

To better illustrate interrupts, and their effect on program flow, attention is directed to FIGS. 1 and 2.

Referring to FIG. 1, a computer system 100 is shown. The computer system 100 includes a microprocessor 102 connected to a data bus 104. The microprocessor 102 is also connected to an interrupt controller 106 via an interrupt line 108 and a control bus 110. The interrupt controller 106 is connected to a plurality of hardware devices including: a system timer 112, a keyboard interface 114, a serial port 116, a floppy disk controller 118, a hard disk controller 120 and a parallel port 122. Also connected to the interrupt controller are a number of expansion slots 124.

In operation, when any of the hardware devices 112–124 wish to communicate with the microprocessor 102, they provide a signal to the interrupt controller 106. The interrupt controller is used as an interface between the microprocessor 102 and the hardware devices 112–124. The interrupt controller 106 receives signals from the hardware devices 112–124, determines which hardware device 112–124 requires access to the microprocessor 102, and sends an interrupt signal on line 108 to the microprocessor 102. In addition, the interrupt controller 106 utilizes the data bus 104, and the control bus 110 to communicate with the microprocessor 102 to let it know which hardware device 112–124 requires attention. The interrupt causes the microprocessor 102 to temporarily suspend execution of the current program and forces it to jump to another program, called the interrupt service routine, or ISR. After the microprocessor 102 services the interrupt, it returns to the original program at the point of interruption, and sends a signal to the interrupt controller 106 to clear the interrupt.

Now referring to FIG. 2, a diagram 200 illustrating program flow during an interrupt is shown. It should be understood that the program as shown, could be executed on the microprocessor 102 of FIG. 1. A program 202 is executing on the microprocessor 102 when the processor receives an interrupt on interrupt line 108. If the interrupt arrives during execution of an instruction 208, the interrupt will cause a branch 204 at position 210 (upon the completion of instruction 208). The branch 204 transfers execution from the executing program 202 to an exception handler 206. More specifically, program flow begins with an instruction service routine 212 which handles the interrupt condition. Upon completion of the interrupt service routine 212, program flow branches back to the executing program 202 at position 210.

What is illustrated by the above is how an interrupt condition causes interruption in program flow, from an executing program 202 to an interrupt service routine 212. However, interruption of program flow in an executing program is not always desirous, and depending on the executing program, can create serious problems. To prevent interrupts from interfering with the program flow of particular programs, interrupts are often "masked" by the processor during execution of those programs.

Within the microprocessor 102 is a control register, or EFLAGS register (not shown), which contains a number of status bits, or flags, which are used to control I/O, interrupts, debugging and task switching. One of these flags is called the Interrupt Flag, or simply the IF bit. When this bit is cleared (i.e., equal to 0), then interrupts are said to be "masked". When the IF bit is set (i.e., equal to 1), then interrupts are allowed. By clearing the IF bit prior to execution of an interrupt sensitive program, interrupts are ignored during execution of that program. Upon completion of the program, the IF bit is set, which allows interrupts to be handled.

In x86 processors, there are three instructions which when executed, may set the IF bit to allow interrupts. The first two instructions, POPF and IRET, overwrite the contents of the control register with a previously stored value. If the IF bit was set in the previously stored control register value, then upon completion of execution of either of these instructions, interrupts will be allowed. In fact, if an interrupt is pending prior to execution of POPF or IRET, then the interrupt will be handled immediately upon completion of executing the POPF or IRET instruction.

The third instruction which sets the IF bit is the STI, or set interrupt flag, instruction. As with the above two instructions, when the STI instruction is executed, the IF bit is set, which allows the processor to handle interrupts. However, unlike the above two instructions, the architecture of x86 processors requires that if the IF bit was cleared prior to execution of the STI instruction, and if an interrupt is pending, either prior to execution of the STI instruction, or concurrent with the execution of the STI instruction, then interrupts are not to be handled until after execution of the instruction which follows STI. So, even after the STI instruction sets the IF bit to allow interrupts, pending interrupts are not to be recognized until after the processor executes the instruction following STI. Only then may the interrupt be handled. At least this was the stated operation of x86 processors for some time.

In 1995, an errata to the Pentium® microprocessor was made which corrected a flaw in the architecture. It was determined that if the STI instruction followed a floating point instruction, and if the floating point instruction created an error condition, and if the instruction which followed STI was a floating point instruction, then a pending interrupt must be handled immediately after execution of the STI instruction. Otherwise, the processor would hang waiting for the floating point error to clear prior to execution of the floating point instruction following STI. The errata therefore changed the specification of the processor to require that upon execution of the STI instruction, if the IF bit was previously clear, and if an interrupt is pending upon completion of the STI instruction, then the interrupt is not to be handled until after execution of the instruction following STI, unless the next instruction is a floating point instruction. In that instance, the interrupt is to be handled immediately.

So, the rule as it stands today, is to allow interrupts immediately after POPF and IRET instructions set the IF bit, to delay handling interrupts for one instruction after the STI instruction sets the IF bit, but to handle interrupts immediately after the STI instruction if the instruction following STI is a floating point instruction.

To implement the rule as stated above has heretofore required significant hardware within a microprocessor to determine whether interrupts are to be allowed after transition of the IF bit. The processor must determine what instruction was being executed at the time the IF bit made a transition (i.e., was it STI, POPF or IRET), whether the prior state of the IF bit was 1 or 0, and whether the instruction which follows the IF bit transition is a floating point instruction. For the processor to monitor each of these conditions, and implement the rule in a timely fashion, costly circuitry surrounding the control register, and the instruction decode/sequencing logic is required. In addition, once the circuitry is designed and placed within a processor, future modifications to the rule will require redesign of the circuitry within the processor. Such redesign is very costly, time consuming, and places manufacturers of x86 processors at a disadvantage when architectural changes are made.

The errata also required that if an STI instruction was followed by a floating point instruction, it was necessary to place an instruction between the STI instruction and the floating point instruction. Otherwise, the x86 processor would hang. Use of a 3rd instruction, such as a NOP, wastes both programming space, and execution time.

SUMMARY

To address the above-detailed deficiencies, it is an object of the present invention to provide an apparatus and method which controls interrupt handling after setting of an interrupt flag, via a software control mechanism located within an exception handler, rather than by a complex hardware circuit.

It is a further object of the present invention to follow the architectural requirements of interrupt handling in x86 processors, upon mask flag transitions, by using an apparatus and method which is less costly than present implementations, and which is adaptable should the architectural requirements change.

It is a further object of the present invention to handle the special case of mask flag transitions, followed by a floating point instruction, without requiring additional hardware to determine whether the interrupt is associated with a prior floating point instruction.

Accordingly, in the attainment of the aforementioned object, it is a feature of the present invention to provide a method for handling an interrupt to a processor during execution of a floating point instruction, especially where the floating point instruction occurs immediately after an instruction, such as an STI instruction, which sets the interrupt flag (IF) in the processor's control register.

The method first determines whether an error flag pertaining to floating point instructions is set, and, if the error flag is not set, executes the floating point instruction. However, if the error flag is set, the processor branches to a floating point exception handler. Within the exception handler, the processor determines whether an interrupt is pending. If an interrupt is not pending, the exception handler loops until an interrupt occurs. Once an interrupt occurs, the processor determines whether the IF flag is set. If the IF flag is set, the processor clears the error flag, handles the interrupt, and executes the floating point instruction.

If, on the other hand, the IF flag is not set, the processor determines whether the last instruction which was executed sets the IF flag. It does this by comparing the micro instruction sequence address for the set flag instruction with a value contained in an exception program counter. If the last executed instruction was the one that sets the IF flag, then the processor clears the error flag, handles the interrupt, and executes the floating point instruction.

An advantage of the present invention is that complex hardware is not required to track whether or not a branch to an interrupt handler is required after setting the interrupt flag.

An additional advantage of the present invention is that if the architectural requirements with respect to interrupt handling is changed or modified, no changes in hardware will be required. Rather, minor changes in the exception handler can be made to accommodate the changed requirements. By placing control for interrupt handling after modification of the interrupt flag within the exception handler, significant expense typically associated with hardware modifications is entirely avoided.

In another aspect, it is a feature of the present invention to provide a processing system for executing a floating point instruction. The processing system has an interrupt line which indicates that an interrupt condition is pending. The processing system has an instruction cache, which stores the floating point instruction, and a register file, which is connected to the instruction cache. The register file has a control register that includes an interrupt flag for indicating whether interrupts are to be handled or masked.

The processing system also includes a control ROM, that is connected to the register file. The control ROM is used to store a number of interrupt programs.

The processing system further includes an exception program counter, that is connected to the instruction cache, that temporarily stores an address corresponding to a last executed instruction; an integer unit, connected to the register file, that executes instructions; a floating point unit, connected to the register file, that executes the floating point instruction; an error flag register, connected to the floating point unit, which indicates whether a previous floating point instruction created an error; and a floating point exception handler, connected to the control ROM. The floating point exception handler determines whether the error flag register is set, and if it is set, reads the exception program counter to determine whether the last executed instruction sets the interrupt flag. If the last executed instruction sets the interrupt flag, and if the interrupt line indicates that an interrupt condition is pending, the processing system clears the error flag register and executes the floating point instruction.

An advantage of the present invention is that a programmer is not required to include a NOP instruction after setting the interrupt flag just to ensure that the program doesn't hang the processor.

BRIEF DESCRIPTION OF THE DRAWINGS

These and other objects, features, and advantages of the present invention will become better understood with regard to the following description, and accompanying drawings where.

DETAILED DESCRIPTION

Figure 1:
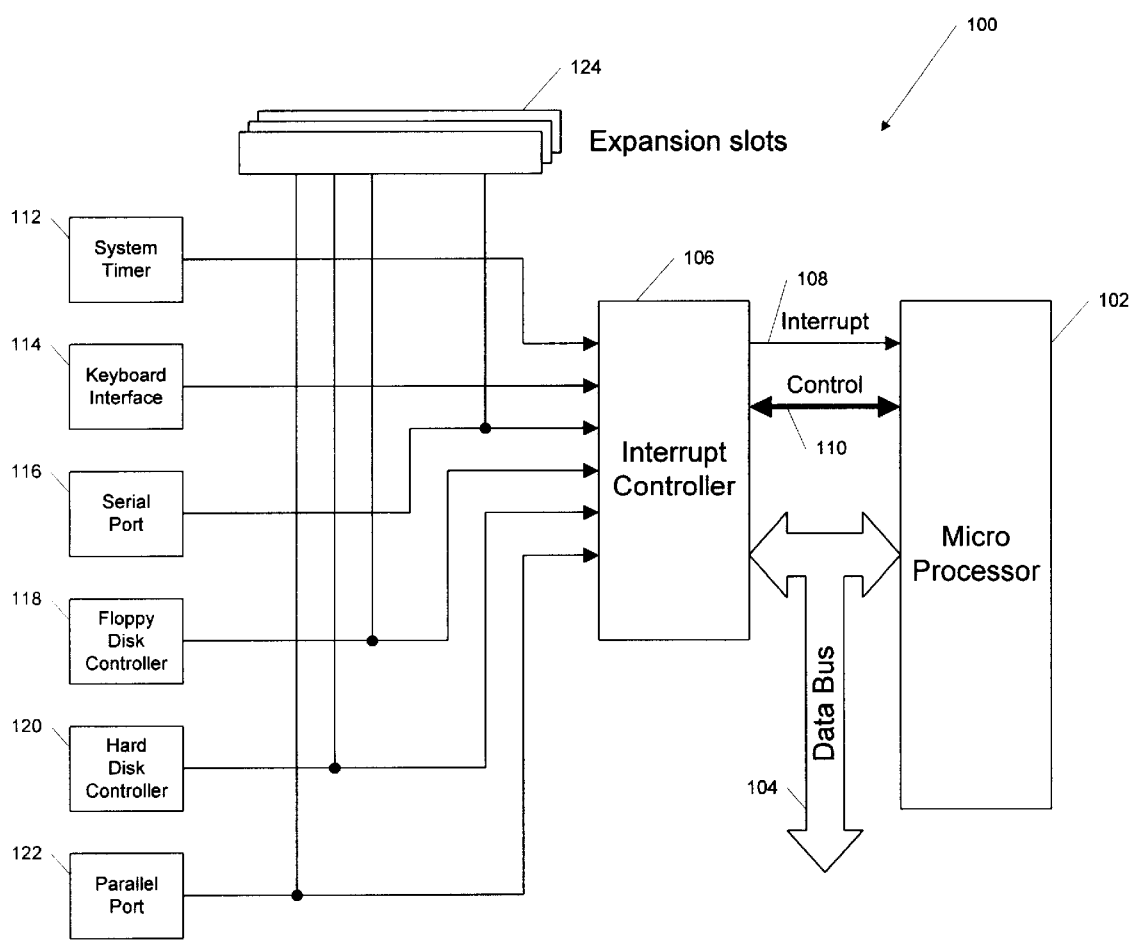
FIG. 1 is a schematic diagram of a computer system which illustrates hardware interrupts to a microprocessor.
Figure 2:
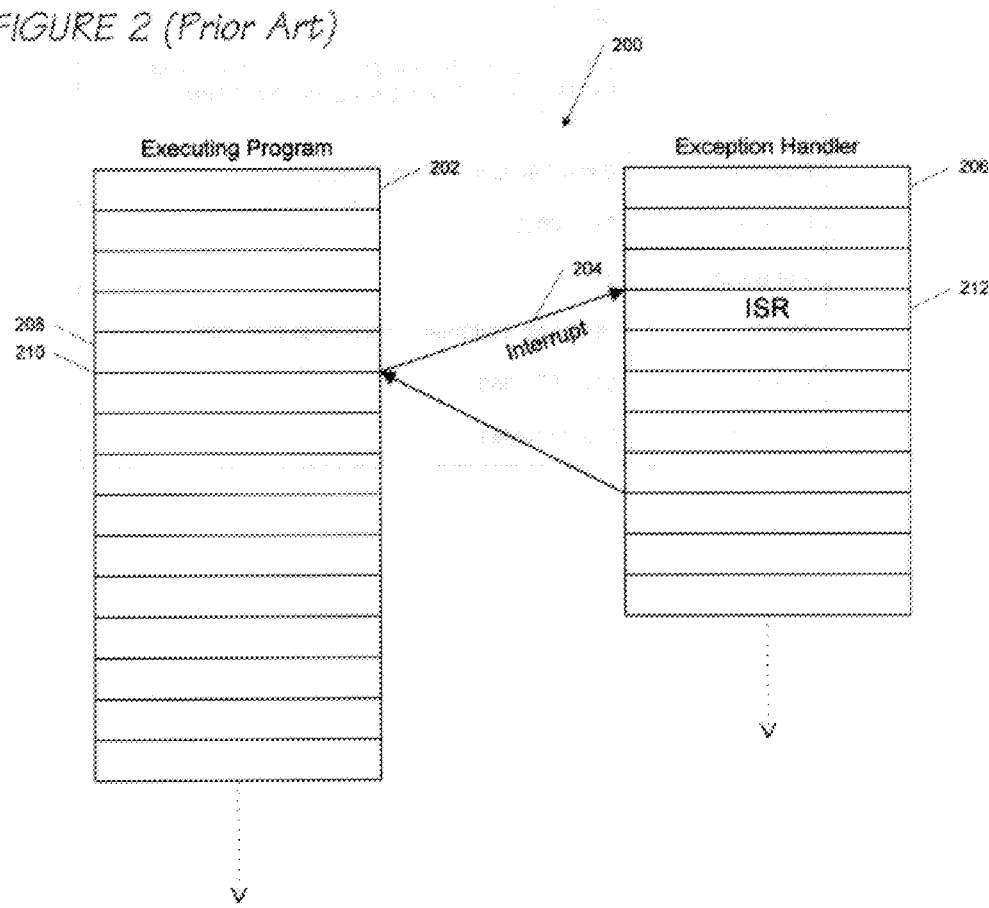
FIG. 2 is a diagram which illustrates program flow in a computer system which has an interrupt.
Figure 3:
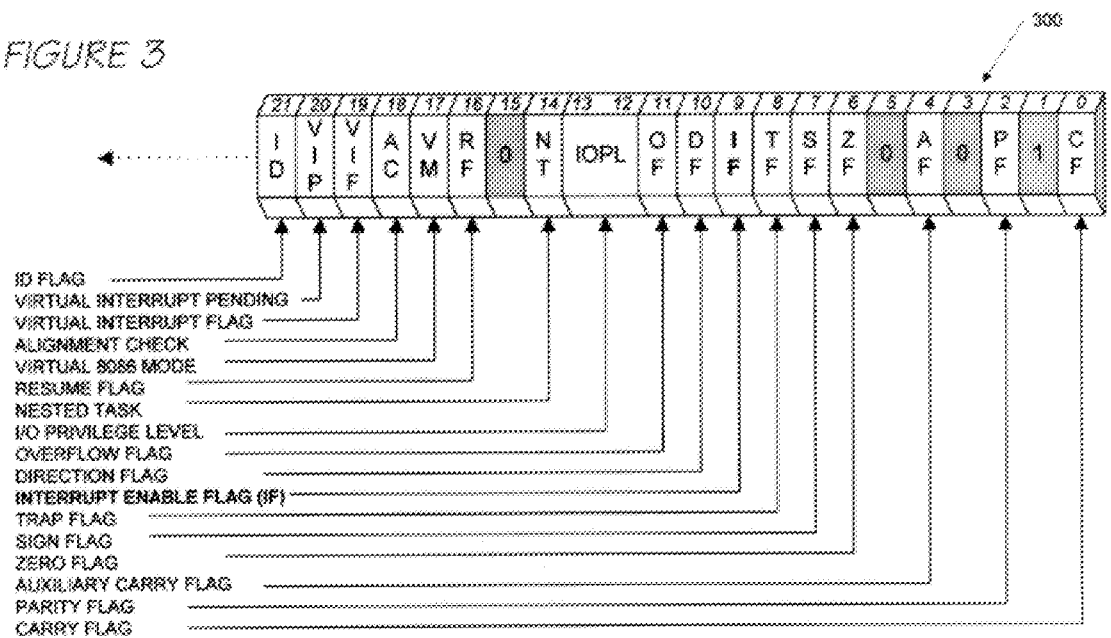
FIG. 3 is a schematic representation of a control register within a computer system, specifically illustrating an interrupt flag.

Referring to FIG. 3, a portion of a control register 300 is shown. One skilled in the art will appreciate that the control register 300 is one of a number of registers within a microprocessor which are accessible by a programmer, and which are used to control I/O, interrupts, debugging, task switching, and virtual-8086 mode. More specifically, bit 9 of the control register 300 is the IF (Interrupt Enable Flag) bit.

Figures 4, 5:
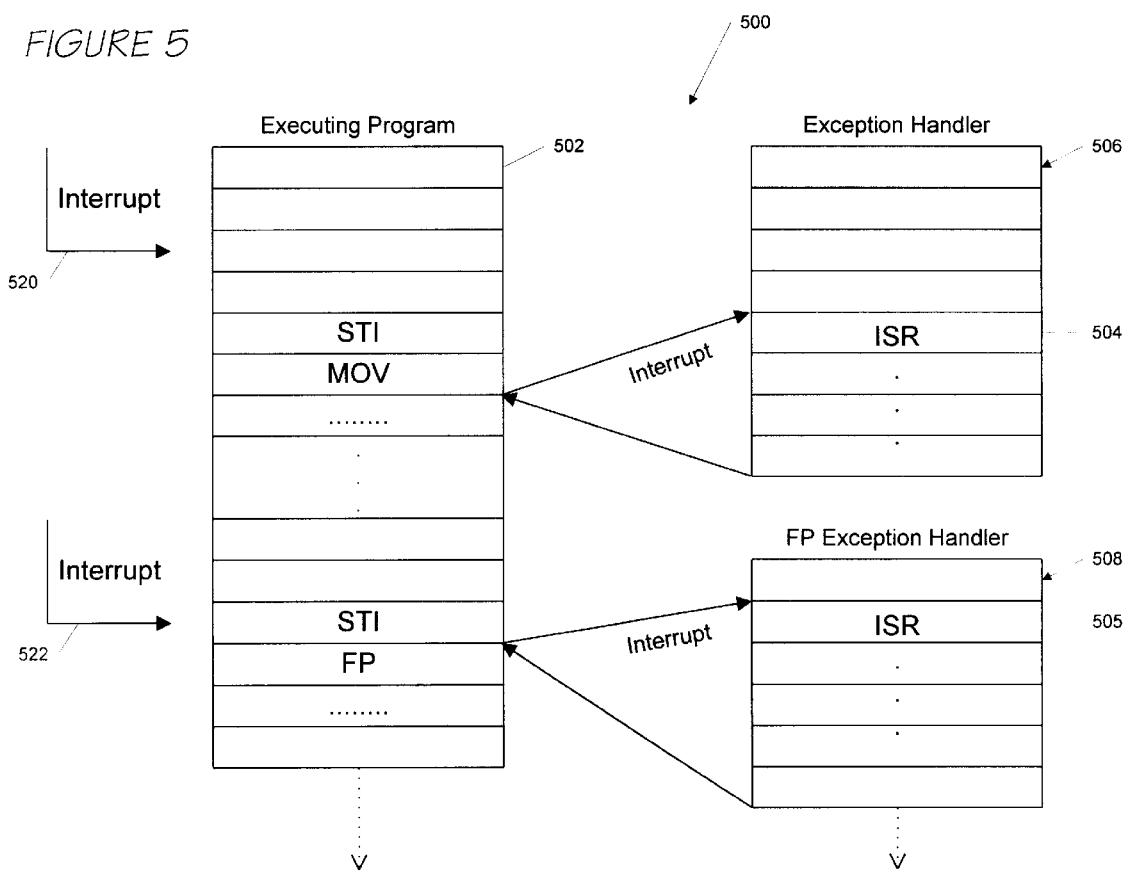
FIG. 4 is a table which illustrates program flow for pending interrupts when transitions occur in the interrupt flag.
FIG. 5 is a diagram illustrating program flow in an x86 processor based system which has two interrupts. The first interrupt occurs prior to the interrupt flag being set, followed by an integer instruction. The second interrupt occurs prior to the interrupt flag being set, followed by a floating point instruction.

Now referring to FIG. 4, a table 400 is shown which illustrates whether interrupts should be masked or handled based on the status of the IF bit. When the IF bit contains a zero, it is considered cleared, and indicates to the processor that interrupts are to be masked. When the IF bit contains a one, it is considered set, and indicates to the processor that interrupts are to be handled.

In addition, FIG. 4 includes a table 402 which illustrates whether an interrupt should be allowed after the IF bit transitions from one state to another. As mentioned above, whether or not an interrupt is handled immediately is determined by the state of the IF bit. If cleared, the interrupt is masked. If set, the interrupt is handled. However, if the IF bit transitions from 0 to 1, and if the transition is caused by the STI instruction, an interrupt is delayed for one instruction, unless the instruction following STI is a floating point instruction. In this case, the interrupt is to be handled immediately.

To further illustrate table 402, as it effects program flow, attention is directed to FIG. 5. In FIG. 5, a diagram 500 is provided which shows program flow between an executing program 502 and an exception handler 506. The diagram 500 illustrates how program flow should occur, based on the rules provided in FIG. 4. Details of how the present invention implements these rules will be provided below.

During execution of program 502, an interrupt 520 occurs. At this point, the IF bit is cleared, so the interrupt is masked until the IF bit is set. After executing the STI instruction, interrupt 520 is delayed for one more instruction (e.g., the MOV instruction). The interrupt is then handled by branching to an interrupt service routine (ISR) 504 within the exception handler 506. Upon completion of the ISR 504, program flow returns to the executing program 502 at the point where the interrupt branch occurred.

At some later time during execution of the program 502 it is presumed that the IF bit is cleared. At this point an interrupt 522 occurs. The interrupt 522 is masked until the IF bit is set. When the STI instruction is executed, it delays setting the IF bit until after completion of the instruction following STI. However, before the FP instruction is executed, it is detected that this instruction is a floating point instruction. The interrupt 522 is therefore recognized, causing program flow to branch immediately to ISR 505 within a floating point exception handler 508. The branch occurs immediately because the STI instruction is followed by a floating point instruction. Upon completion of the ISR 505, program flow branches back to the executing program 502 at the point where the interrupt branch occurred, and the FP instruction is executed.

Figure 6:
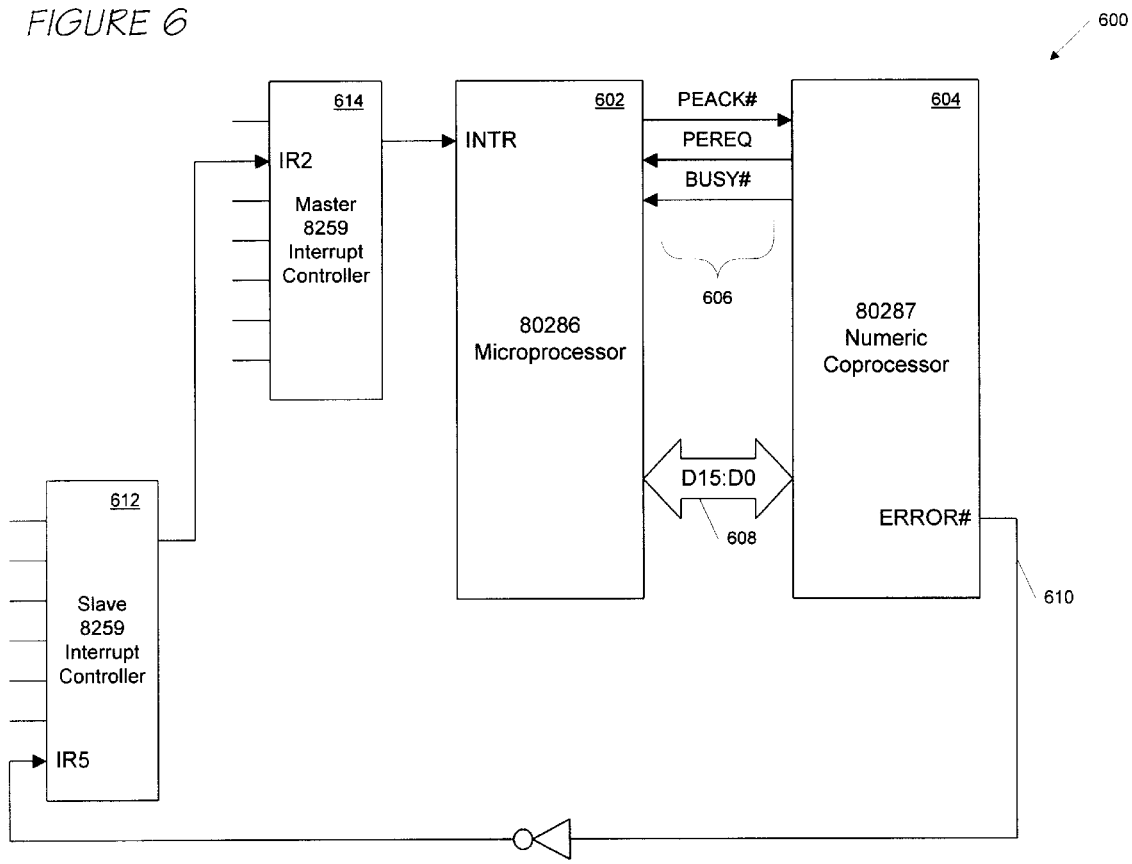
FIG. 6 is a block diagram of an x86 processor connected to an external floating point coprocessor.

The above description, associated with FIGS. 3–5, illustrate the operation of a processor which meets the x86 architectural requirements upon transition of the mask flag IF. Attention is now directed to FIG. 6.

Now referring to FIG. 6, a block diagram of an 80286 processing system 600 is shown. The processing system 600 includes an 80286 microprocessor 602 connected to a floating point coprocessor 604. The processor 602 is connected to the coprocessor 604 via three processor extension interface lines 606, and a data bus 608. The 80286 processor 602 performs all integer processing functions for the system 600, but passes off floating point operations, as needed, to the 80287 processor 604. When the processor 602 encounters a floating point instruction, the processor 602 suspends execution, and passes the floating point instruction to the coprocessor 604. The coprocessor 604 executes the floating point instruction, and when complete, returns control back to the processor 602.

When a floating point instruction is passed from the processor 602 to the floating point coprocessor 604, if the coprocessor 604 encounters an error, such as a numeric overflow, a precision exception, or a stack fault, an error signal is provided by the coprocessor 604 on an error line 610 which is connected to a slave interrupt controller 612. The slave interrupt controller 612 provides this interrupt to a master interrupt controller 614, which in turn provides the interrupt to the processor 602. In an ISA (Industry Standard Architecture) computer, the interrupt is provided as IRQ#13. The interrupt causes the processor 602 to branch to an exception handler which corrects the error condition, and continues executing the program.

System 600, as described above, provides a historical understanding of why a floating point error within a coprocessor 604 required an external interrupt to the processor 602, to correct an error condition caused by a floating point instruction. With that understanding, attention is now directed to FIG. 7.

Figure 7:
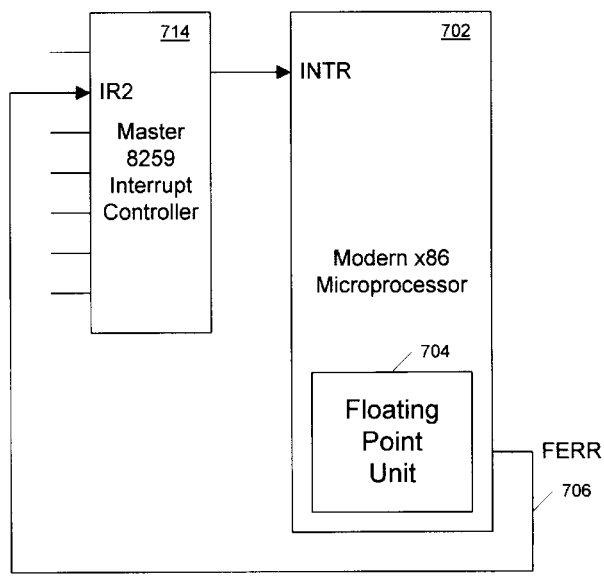
FIG. 7 is a block diagram of an x86 processor having an internal floating point coprocessor.

FIG. 7 is a block diagram of a modern x86 processor 702. Within the processor 702 is a floating point coprocessor 704. Execution of a floating point instruction within the processor 702 is similar to that described above, with respect to FIG. 6. However, to obtain backwards compatibility, the floating point unit 704 still requires that floating point error conditions be reported to the processor 702 via an external interrupt. Thus, when the floating point unit 704 encounters an error, an FERR signal on line 706 is provided to an external interrupt controller 714. The interrupt controller 714 provides the interrupt back to the processor 702. The processor 702 then handles the interrupt in the manner described above.

One skilled in the art should appreciate that within modern x86 processors, even though the floating point coprocessor may reside on the same piece of silicon as the main processor, error conditions within the floating point coprocessor still require that an error signal be generated, and sent outside of the main processor to an interrupt controller. The interrupt controller then transmits the interrupt back to the main processor to correct the error condition. To better illustrate program flow within the processor 702 during execution of a floating point instruction, attention is now directed to FIG. 8.

Figure 8:
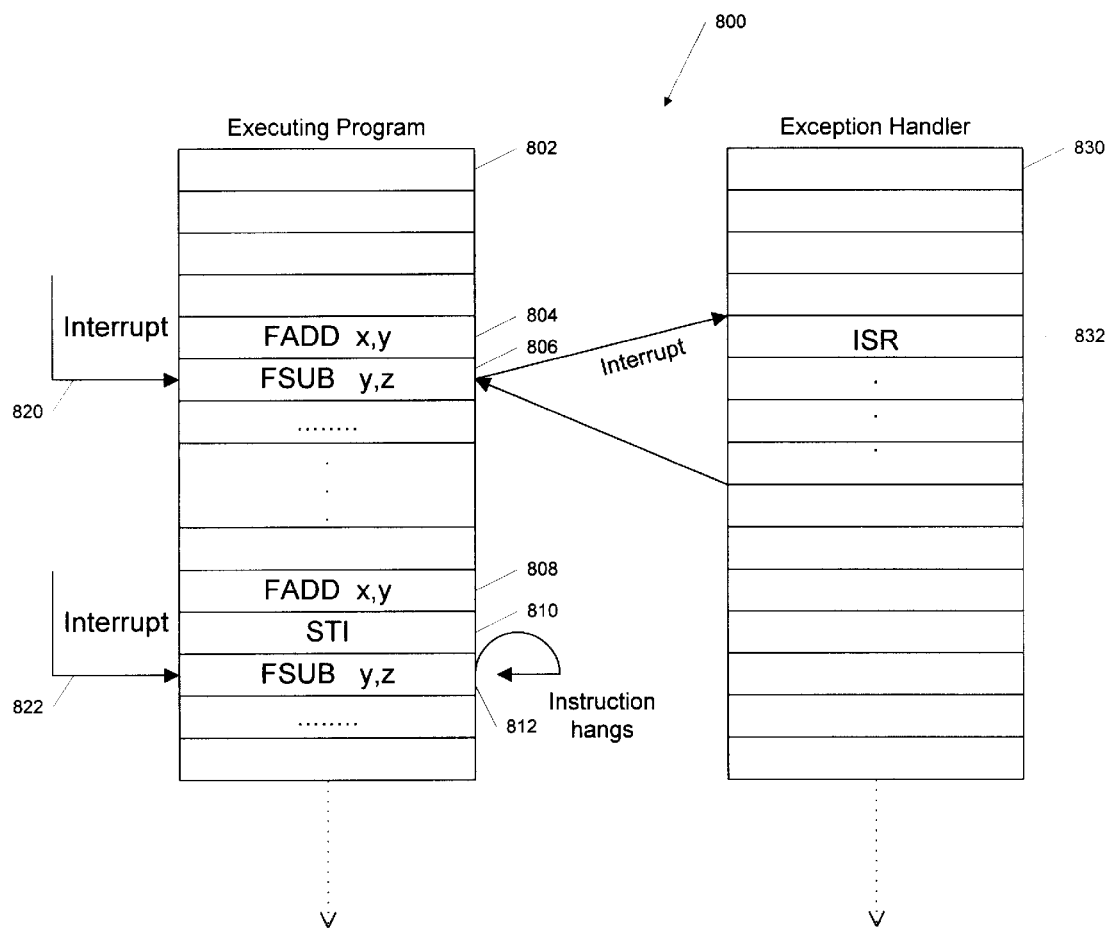
FIG. 8 is a diagram which illustrates program flow in a computer system which has a floating point error interrupt.

FIG. 8 shows a diagram 800 illustrating program flow, within the processor 702, for two sets of floating point instructions within an executing program 802. The first set of floating point instructions are to be executed sequentially. And, it is presumed that the IF bit within the processor 702 is set to allow interrupts prior to their execution. The second set of floating point instructions contain an STI instruction in between them, and it is presumed that the IF bit is cleared prior to execution of the STI instruction.

During execution, a first floating point instruction FADD x,y 804 is encountered. This instruction is passed to the floating point unit 704 for execution. During execution, an error condition is presumed to occur. When the error condition occurs, an error flag (not shown) within the floating point unit 704 is set. In addition, the floating point unit 704 generates an FERR signal on line 706 to the interrupt controller 714. At this point, the processor 702 is not yet aware of the error condition, and has fetched a second floating point instruction FSUB y,z 806 for execution. The instruction 806 is passed to the floating point unit 704. When the instruction 806 is passed to the floating point unit 704, the error flag, set by the error condition, causes the floating point unit to jump to a floating point exception handler which loops until the error flag is cleared. While looping, an FERR interrupt 820 arrives at the processor 702. Since the IF bit is set, the processor 702 branches to an ISR 832 within an exception handler 830 which corrects the error condition, and clears the error flag within the floating point unit 704. Once the error flag has been cleared, the FSUB y,z instruction 806 can complete execution.

At some later time, the second set of floating point instructions is encountered. However, prior to their execution, the IF flag has been cleared to mask external interrupts. When the first instruction FADD x,y 808 is encountered, it is passed to the floating point unit 704 for execution. During execution, it is presumed that the instruction 808 creates an error. As before, the floating point unit sets the error flag, and generates an FERR signal 822 to the interrupt controller 714. While this is occurring, the processor 702 executes an STI instruction 810 to set the IF bit to allow interrupts. However, as was explained above with reference to FIGS. 4 and 5, the IF bit is not actually set (or rather, interrupts are not recognized), until after the instruction following STI has completed execution.

The processor 702 then fetches the next floating point instruction 812, and passes this instruction to the floating point unit 704. At this point, since the error flag within the floating point unit 704 is set, the floating point unit 704 begins a loop within the floating point exception handler until the error flag has been cleared. In addition, the FERR signal 822 is provided to the processor 702 to handle the floating point error created by the FADD x,y instruction 808. However, it should be appreciated that the IF bit is cleared, or not recognized, so that the FERR interrupt 822 is still masked by the processor 702. Recall that the IF bit should continue to mask interrupts until completion of the instruction following the STI instruction 810.

This condition, where a first floating point instruction 808 creates an error condition, where the instruction 808 is followed by an STI instruction 810 which transitions the IF bit from 0 to 1, and where the STI instruction 810 is immediately followed by a second floating point instruction 812, causes modern x86 processors to hang. The second floating point instruction 812 cannot execute until the error flag in the floating point unit 704 is cleared, but the error flag cannot be cleared until the interrupt 822 is handled. Additionally, the interrupt cannot be handled until the second floating point instruction 812 has completed execution. Catch-22! This condition resulted in an errata being published for the Pentium® processor which required all programmers to insert a dummy instruction, such as a NOP, after an STI instruction, just to prevent the processor from hanging.

Figure 9:
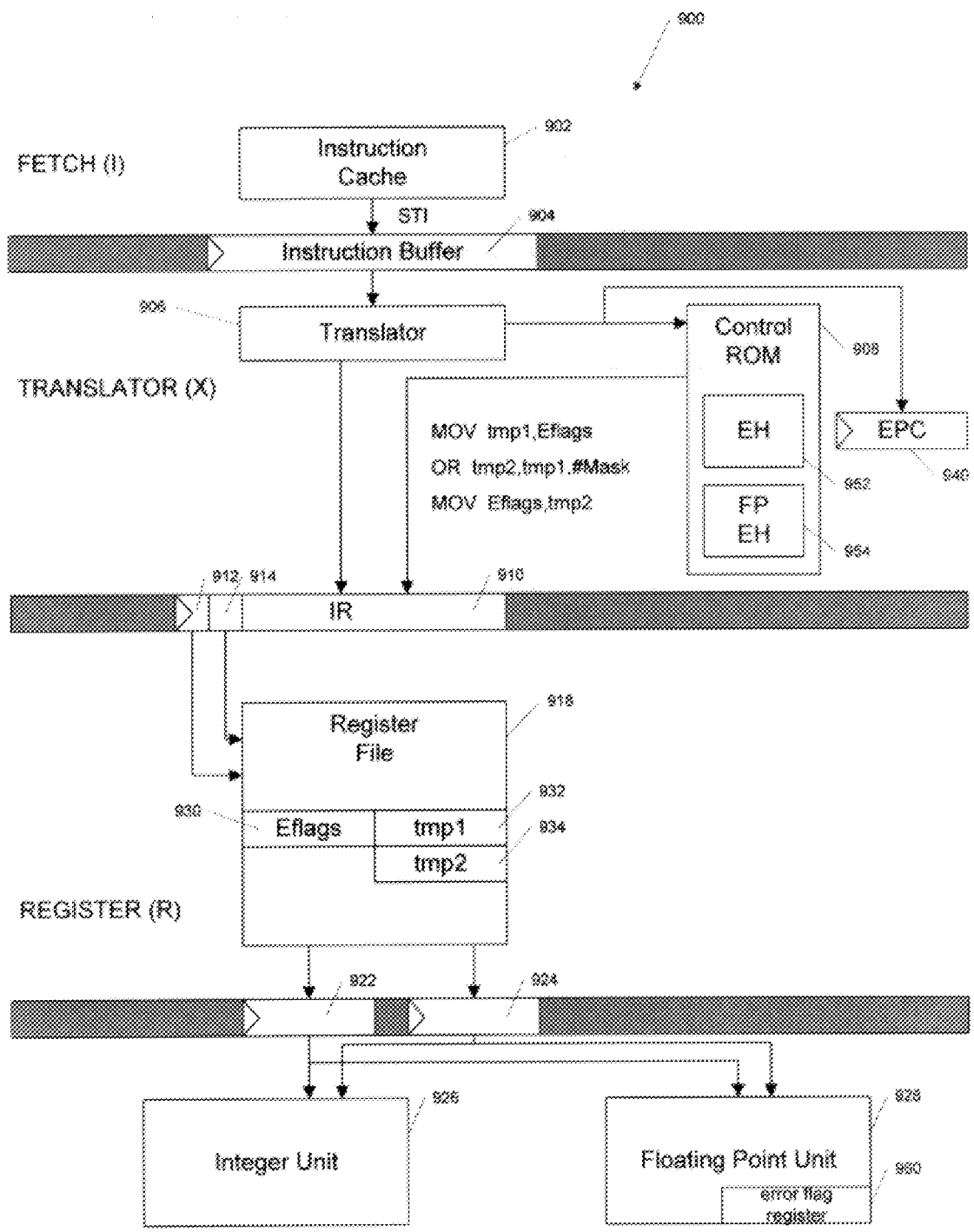
FIG. 9 is a partial schematic diagram of a pipeline processor which incorporates the present invention.

What will now be described, with reference to FIG. 9, is an embodiment of the present invention which handles the rules for IF bit transition, as described above with reference to FIG. 4, including the above described hanging condition, without adding additional tracking circuitry to a processor, and without requiring a programmer to insert a NOP instruction after the STI instruction.

FIG. 9 is a block diagram of a portion of a pipeline processor 900 which embodies the present invention. The processor 900 includes an instruction cache 902 for storing instructions to be executed by the processor 900. The instruction cache 902 is connected to an instruction buffer 904 which temporarily holds the next instruction to be executed by the processor 900. For purposes of illustration, an STI instruction is shown provided by the instruction cache 902 to the instruction buffer 904. The instruction buffer 904 is connected to a translator 906 which translates the STI instruction into a sequence of micro instructions which will be executed by the processor 900.

More specifically, the translator 906 determines that the instruction in the instruction buffer 904 is an STI instruction. The translator 906 addresses the appropriate micro instruction sequence within a control ROM 908 which provides the micro instruction sequence for the STI instruction. The control ROM 908 contains micro instruction sequences (not shown) for use by the processor 900, as well as an exception handler 952, and a floating point exception handler 954.

The micro instructions within the sequence are provided, one at a time, to an instruction register 910 for use by later stages in the pipeline processor 900. In addition, an exception program counter (EPC) 940 is provided which stores the address for the micro instruction sequence pertaining to the instruction contained in the instruction buffer 904. In this instance, the address corresponds to the STI instruction.

Within the instruction register 910 are two operand locations 912, 914 which are used to provide the operands associated with each micro instruction to a register file 918. The register file 918 contains a plurality of general purpose registers, segment registers and control registers (not shown) which are addressed by the operands 912, 914 to provide data and address information to temporary buffers 922, 924 for use by either an integer unit 926 or a floating point unit 928. Within the floating point unit 928 is an error flag register 960 which is used to indicate that a particular floating point instruction created an error condition.

In addition, the register file 918 contains an Eflags register 930 for storing control information, such as the IF bit. The register file 918 also contains a temporary register tmp1 932 and a temporary register tmp2 934 for use as follows.

The first micro instruction which is provided to the instruction register 910 when the STI instruction is in the instruction buffer 904 is MOV tmp1,Eflags. This instruction causes the contents of the Eflags register 930 to be copied into the tmp1 register 932. The second instruction in the sequence is OR tmp2,tmp1,#MASK. This instruction performs an OR operation between the contents of the tmp1register 932 and an immediate operand #MASK and places the result of the OR in the tmp2 934 register. To set the IF bit equal to 1, and not modify any other bit in the Eflags register 930, the #MASK would contain all zeroes except in bit position 9, where it would contain a one.

The third micro instruction, MOV Eflags,tmp2, moves the contents of the tmp2 register 934 into the Eflags register 930. Execution of these three micro instructions sets the IF bit within the Eflags register 930, and thereby allows the processor 900 to allow interrupts.

What should be appreciated, at this point, is that in setting the IF bit, one of the temporary registers, tmp1 932, still contains the contents of the Eflags register prior to setting the IF bit. And, if no other instructions are executed before examining the tmp1 register 932, the prior state of the IF bit can be determined. Furthermore, the address stored in the EPC 940 still points to the micro instruction sequence pertaining to the instruction STI. By examining the EPC 940, it can be determined whether STI was previously executed. With this in mind, attention is now directed to FIG. 10.

Figure 10:
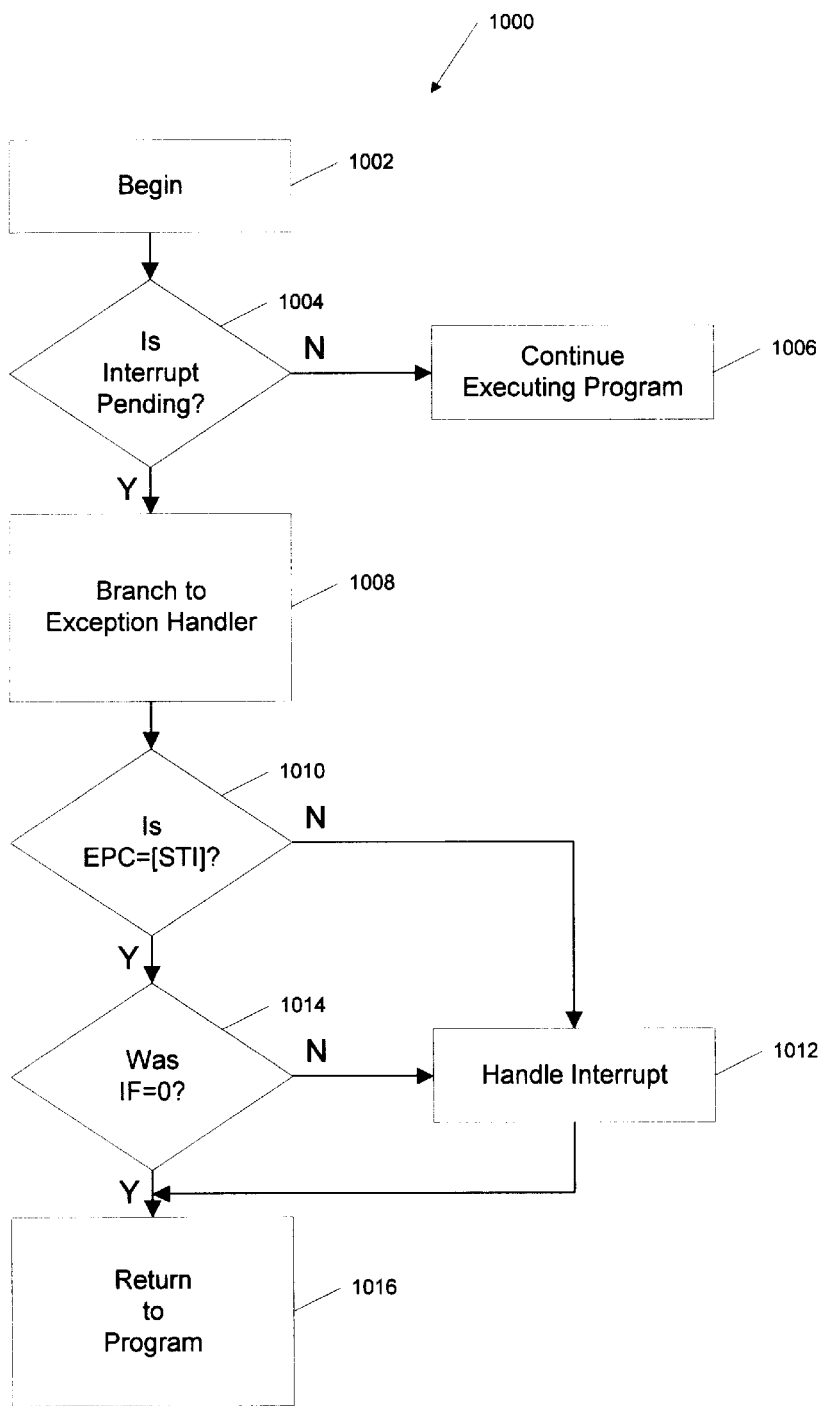
FIG. 10 is a flow chart illustrating program flow in an exception handler according to the present invention.

FIG. 10 provides a flow chart 1000 which illustrates program flow during an interrupt according to the present invention. In one embodiment, if the IF bit is set, interrupts cause an immediate branch to the exception handler, whether or not the instruction which set the IF bit was an STI instruction, whether or not the prior state of the IF bit was cleared, and whether or not the next instruction is a floating point instruction. Flow chart 1000 begins at block 1002. Flow proceeds to decision block 1004.

At decision block 1004, a determination is made as to whether an interrupt is pending for the processor 900. If not, then program flow proceeds to block 1006 where the program continues execution. If an interrupt is pending, program flow proceeds to block 1008.

At block 1008, the processor branches to the exception handler. Program flow then proceeds to decision block 1010.

At decision block 1010, the exception handler determines whether the contents of the EPC 940 contain the address corresponding to the STI micro instruction sequence. If not, then the exception handler branches to the ISR for the pending interrupt, and handles the interrupt, at block 1012. Program flow then branches back to the main program, at block 1016. If however the EPC=[STI], then program flow proceeds to decision block 1014.

At decision block 1014, the processor examines the tmp1 register 1032 to determine whether the IF bit was set or cleared. If the prior state of the IF bit was 1, then program flow proceeds to the ISR pertaining to the interrupt, and the interrupt is handled, at block 1012. Program flow then proceeds back to the main program, at block 1016.

However, if it is determined that the prior state of the IF bit was 0, then the interrupt is temporarily ignored, and program flow branches back to the main program, at block 1016. In this instance, it has been determined that an interrupt was pending, that an STI instruction set the IF bit, and the prior state of the IF bit was zero. To follow the rule for mask flag transition, interrupts are not to be handled until after the instruction following the STI instruction, unless the next instruction is a floating point instruction.

The above invention presumes that if an interrupt is pending, and the IF bit is set, that the interrupt should be handled. Branching therefore occurs to the exception handler which determines whether or not the special case for STI exists. If not, then the interrupt is handled. If so, then program flow returns back to the main program without handling the interrupt. In addition, provision is made to not allow the interrupt to be taken until after completion of the next instruction.

More specifically, the IF bit within the Eflags register 930 is not actually set until the instruction following STI completes execution. A special control suffix of .T is used within the last instruction of a micro instruction sequence to indicate that the sequence is complete. The hardware within the processor 900 looks for the .T suffix in the micro instruction sequence which is executed after the STI instruction, and sets the IF bit in the Eflags register 930 as the micro instruction with the .T suffix executes.

By branching to the exception handler when interrupts are pending, and when the IF bit is set, mask flag transitions unrelated to STT are handled immediately. And, when the prior state of the IF bit was 1, interrupts are handled immediately. However, for the special case where the prior state of IF was 0, and the IF bit is set by STI, the interrupt is ignored.

Figure 11:
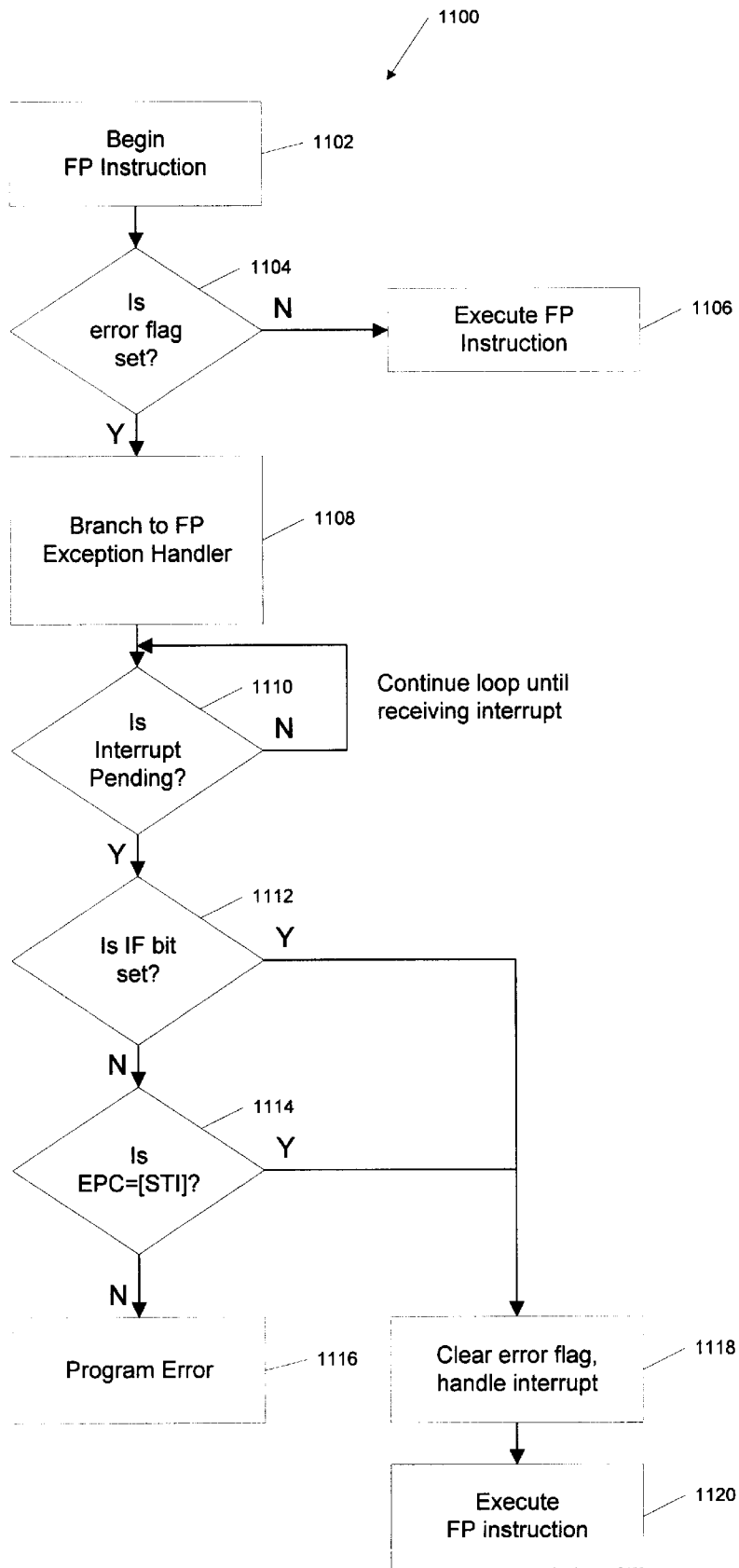
FIG. 11 is a flow chart illustrating program flow in a floating point exception handler according to the present invention.

Now, for the condition where the STI instruction was preceded by a first floating point instruction, where the first floating point instruction created an error condition in the floating point unit, and where the STI instruction is immediately followed by a second floating point instruction, reference is now made to FIG. 11.

FIG. 11 provides a flow chart 1100 which illustrates program flow for executing a floating point instruction within the processor 900. Program flow begins at block 1102, where a floating point instruction is to be executed, and proceeds to decision block 1104.

At decision block 1104, the processor 900 determines whether the error flag for the floating point unit has been set. If not, then no prior floating point instruction created an error condition, and the floating point instruction is executed at block 1106.

However, if the error flag has been set, program flow branches to the floating point exception handler 954, at block 1108.

Within the floating point exception handler 954, a decision block 1110 is used to create a loop condition which tests whether an interrupt is pending for the processor 900. If an interrupt is not pending, then the processor 900 remains in this loop until an interrupt arrives. Recall that the only way to clear a floating point error condition in an x86 processor is via an external interrupt. When an interrupt arrives, program flow proceeds to decision block 1112.

In decision block 1112, a test is made to see if the IF bit in the Eflags register 930 is set. If the IF bit is set, then program flow proceeds to block 1118 where the error flag is cleared, and the interrupt is handled. After handling the interrupt, to correct the error condition, the floating point instruction is executed, at block 1120. However, if the IF bit is not set, then program flow proceeds to decision block 1114.

At decision block 1114, a test is made to determine whether the EPC register 940 contains the address for the micro instruction sequence corresponding to the STI instruction. If not, then a program error has occurred, shown by block 1116. One skilled in the art should appreciate that the only way to arrive at program block 1116 is to attempt to execute two floating point instructions while the IF bit is clear. This condition is not allowed in x86 microprocessors. If EPC=[STI], then program flow proceeds to execution block 1118 where the error flag is cleared, and the interrupt is handled. The floating point instruction is then executed as shown by block 1120. It should also be noted that the interrupt is handled, to clear the floating point error condition, even though the IF bit has not yet been "written" into the Eflags register 930. This is because the floating point exception handler 954 has recognized that the IF bit is to be modified, whether or not the particular implementation has changed the Eflags register 930. In an alternative embodiment, the Eflags register 930 is changed upon completion of the STI instruction, but cannot be read as set until after the instruction following STI completes execution.

By utilizing the exception handler, along with tmp1 register 932, and EPC 940, control for interrupt handling has been performed, without requiring specialized hardware to track IF bit transitions, and the STI instruction. In fact, no additional hardware has been required to determine whether or not an interrupt should be handled after an IF bit transition. If future architectural changes are made which require different conditions relating to interrupt handling, implementation of the changes can very likely be made by modifying the exception handler, and without modifying any hardware in the processor.

Thus, x86 architectural requirements for interrupt handling after a mask flag transition have been met by using an exception handler, rather than complex hardware tracking mechanisms. For the special case where the prior state of the IF bit was clear, and the IF bit is set by the STI instruction, and the instruction following STI is a floating point instruction, a series of tests are made within the floating point exception handler to determine whether the instruction immediately proceeding the floating point instruction was an STI instruction. And, whether the STI instruction caused a transition from 0 to 1. If both of these conditions are met, then the floating point error flag is cleared, and the interrupt is handled immediately.

Although the present invention has been described in considerable detail with reference to certain preferred versions thereof, other versions are possible. For example, temporary locations other than tmp1 and EPC may be used to store information related to the prior state of the IF bit, and the prior instruction which was executed by the processor. These were used in the present embodiment because both were already available, and did not require any additional modifications to the processor. In addition, the above described invention does not preclude a manufacturer from including some hardware tracking mechanism for handling interrupts. Rather, the invention presumes that if the IF bit is set, and an interrupt is pending, a branch should occur to a program which determines whether the interrupt should be handled.

In addition, as mentioned above, one embodiment for insuring that interrupts are not taken until completion of the instruction following STI actually delays writing the IF bit into the Eflags register until the following instruction completes. In an alternative embodiment, the STI instruction immediately sets the IF bit in the Eflags register, but the Eflags register is prevented from being used to handle interrupts until completion of the instruction following STI. In either case, interrupts are ignored until completion of the instruction following STI.

In the embodiment of the present invention described above, the floating point exception handler contained the loop which tested for pending interrupts if a floating point error condition existed. One skilled in the art will appreciate that placement of the program sequence of FIG. 11 within the floating point exception handler is desirous. However, it is within the scope of the present invention to place the floating point error tests of FIG. 11 in any location that can be accessed by the processor.

Although the present invention and its objects, features and advantages have been described in detail, those skilled in the art should appreciate that they can readily use the disclosed conception and specific embodiment as a basis for designing or modifying other structures for carrying out the same purposes of the present invention, and that various changes, substitutions and alterations can be made herein without departing from the spirit and scope of the invention as defined by the appended claims.

We claim:

1. A method for handling an interrupt during execution of a floating point instruction, the floating point instruction occurring immediately after an instruction which sets an interrupt flag (IF) in a control register within a processor, the method comprising:
  a) determining whether an error flag is set;
  b) if the error flag is not set, executing the floating point instruction;
  c) if the error flag is set, branching to a floating point exception handler;
    i) determining whether an interrupt is pending;
      a) if an interrupt is not pending, looping in step 1)c)i) until an interrupt occurs;
    ii) if an interrupt is pending, determining whether the IF flag is set;

a) if the IF flag is set, clearing the error flag, handling the interrupt, and executing the floating point instruction;
b) if the IF flag is not set, determining whether the last instruction which was executed sets the IF flag;
   i) if the last executed instruction sets the IF flag, then clearing the error flag, handling the interrupt, and executing the floating point instruction.

2. The method for handling an interrupt, as recited in claim 1, wherein the control register is a flags register which comprises flags used by the processor to control program flow.

3. The method for handling an interrupt, as recited in claim 1, wherein the interrupt flag is a single bit that indicates whether interrupts should be allowed or ignored.

4. The method for handling an interrupt, as recited in claim 3, wherein if the interrupt flag is cleared, interrupts are masked.

5. The method for handling an interrupt, as recited in claim 3, wherein if the interrupt flag is set, interrupts are not masked.

6. The method for handling an interrupt, as recited in claim 1, wherein the instruction which sets the interrupt flag (IF) is an STI instruction.

7. The method for handling an interrupt, as recited in claim 6, wherein the STI instruction delays setting the interrupt flag until the instruction which follows it completes execution.

8. The method for handling an interrupt, as recited in claim 1, wherein if an interrupt is handled, program flow within the processor branches to an interrupt program which handles the interrupt.

9. The method for handling an interrupt, as recited in claim 8, wherein the interrupt program is located within an exception handler.

10. The method for handling an interrupt, as recited in claim 1, wherein the error flag is a flag within the processor which indicates whether a previous floating point instruction caused an error.

11. The method for handling an interrupt, as recited in claim 10, wherein if the error flag is set, a previous floating point instruction caused an error.

12. The method for handling an interrupt, as recited in claim 11, wherein the floating point instruction cannot execute until the error flag has been cleared.

13. The method for handling an interrupt, as recited in claim 1, wherein the floating point exception handler comprises a plurality of programs for handling floating point exceptions.

14. The method for handling an interrupt, as recited in claim 1, wherein the floating point exception handler is stored within a control ROM within the processor.

15. The method for handling an interrupt, as recited in claim 1, wherein said step of determining whether the last instruction which was executed further comprises:
a) reading an exception program counter pertaining to the last instruction executed by the processor;
b) determining whether the contents of the exception program counter correspond to the set interrupt flag instruction.

16. A processing system for executing a floating point instruction, the processing system having an interrupt line for indicating that an interrupt condition is pending, the processing system comprising:
a) an instruction buffer, for storing the floating point instruction;
b) a register file, coupled to said instruction buffer, said register file further comprising a control register, said control register having an interrupt flag;
c) a control ROM, coupled to said register file, said control ROM for storing a plurality of interrupt programs;
d) an exception program counter, coupled to said instruction buffer, for temporarily storing an address corresponding to a last executed instruction;
e) an integer unit, coupled to said register file, for executing instructions;
f) a floating point unit, coupled to said register file, for executing the floating point instruction;
g) an error flag register, coupled to said floating point unit, for indicating whether a previous floating point instruction created an error; and
h) a floating point exception handler, within said control ROM, said floating point exception handler for determining whether said interrupt flag is set, and if it is not set, for reading said exception program counter to determine whether the last executed instruction sets said interrupt flag;
i) wherein if the last executed instruction sets said interrupt flag, and if the interrupt line indicates that an interrupt condition is pending, said processing system clears said error flag register and executes said floating point instruction.

17. The processing system, as recited in claim 16, wherein the processing system is a microprocessor.

18. The processing system, as recited in claim 16, wherein an interrupt condition may be created by a previous floating point instruction having an error condition.

19. The processing system, as recited in claim 18, wherein said interrupt condition causes said floating point unit to generate an interrupt on said interrupt line to indicate that an interrupt condition is pending.

20. The processing system, as recited in claim 16, wherein when said interrupt flag is cleared, said pending interrupt condition should not be handled.

21. The processing system, as recited in claim 16, wherein said control ROM also stores micro instruction sequences, corresponding to macro instructions, for execution by said processing system.

22. The processing system, as recited in claim 16, wherein said control register may be overwritten by said processing system, when setting or clearing said interrupt flag.

23. The processing system, as recited in claim 22, wherein when said control register is overwritten, the last value of said control register is stored in a temporary register.

24. The processing system, as recited in claim 23, wherein said temporary register contains the previous value of said interrupt flag before said control register was overwritten.

25. The processing system, as recited in claim 16, wherein an instruction which sets said interrupt flag is STI.

26. The processing system, as recited in claim 25, wherein said STI instruction delays setting said interrupt flag for at least one instruction.

* * * * *